United States Patent
Obhan

[19]

[11] Patent Number: 5,875,302
[45] Date of Patent: Feb. 23, 1999

[54] COMMUNICATION MANAGEMENT SYSTEM HAVING COMMUNICATION THREAD STRUCTURE INCLUDING A PLURALITY OF INTERCONNECTED THREADS

[75] Inventor: Prem A. Obhan, Plano, Tex.

[73] Assignee: Northern Telecom Limited, Montreal, Canada

[21] Appl. No.: 851,672

[22] Filed: May 6, 1997

[51] Int. Cl.$^6$ ................................................. G06F 13/00
[52] U.S. Cl. ................................................. 395/200.55
[58] Field of Search ..................... 395/200.36, 200.55, 395/200.58, 200.59, 200.33, 200.47, 200.49, 200.53, 200.57, 684, 685, 280, 610, 611, 613

[56] References Cited

U.S. PATENT DOCUMENTS

| | | | |
|---|---|---|---|
| 5,577,247 | 11/1996 | Uyama et al. | 707/10 |
| 5,689,708 | 11/1997 | Regnier et al. | 395/200.59 |
| 5,706,437 | 1/1998 | Kirchner et al. | 395/200.33 |

OTHER PUBLICATIONS

"Networked Computing: NCR features enterprise—wide networked computing products for telecom industry", EDGE, on I abort AT&T, V7, N204, Jun. 1992.

*Primary Examiner*—Moustafa M. Meky
*Attorney, Agent, or Firm*—Bruce E. Garlick

[57] ABSTRACT

A communication management system and method of operation includes a structure registration interface, a user registration, a submission interface, a communication server and an access interface. The structure registration interface receives structure data and establishes a communication thread structure having a plurality of interconnected threads based upon the structure data. The user registration interface receives user data and establishes user information based upon the user data, the user information linking a user with at least one thread of the plurality of interconnected threads. The submission interface receives communications and at least one desired thread of the plurality of interconnected threads and links the communications with at least some of the plurality of interconnected threads. The communication server establishes links between communications and user information based upon threads of the plurality of interconnected threads. Finally, the access interface receives a communication access request from a user, receives communications from the communication server based upon the communication access request, the user information and thread linkages between the communications and the user information and provides the received communications to the user. The communication management system may also include a notification interface that notifies a user when a communication is received that is linked to the user by at least one thread. The notification interface may notify a user when a communication has been received that is linked to the user by at least one thread and has a notification priority greater than or equal to a notification priority respective to the user.

28 Claims, 19 Drawing Sheets

COMMUNICATION INFORMATION

| COMM. CONTENT | TIME STAMP | COMM. SOURCE | NOTIF. PRI | SECURITY LEVEL | THREAD IDENTIFIERS |
|---|---|---|---|---|---|
| FAX 1 | 5/5/97, 07:07 | 707-0707 | 1 | 2 | MKTG_US, MKTG_CAN |
| EMAIL 1 | 5/5/97, 12:32 | JOE@IO.COM | 2 | 1 | SALES_ALL, MKTG_ALL |
| VOICE 1 | 5/5/97, 18:40 | WWW.NORTEL.COM | 4 | 1 | MKTG_US_PARTX |
| FILE 1 | 5/5/97, 22:12 | JOE/HME/PG | 3 | 1 | PATENTS_RICHARDSON |
| EMAIL 2 | 5/5/97, 23:42 | BILLW@WH.ORG | 2 | 2 | SALES_RR_GROUP A |

FIG. 2

USER INFORMATION

| USER ~302 | PASS WORD ~304 | FAX ~306 | NOTIFICATION INFO ~308 | | SEC. LVL. ~310 | NOT. PRI. ~312 | PH. # ~314 | HOME DIRECT. ~316 | THREAD IDS. ~318 |
|---|---|---|---|---|---|---|---|---|---|
| 320 ⟶ JOE | XYZ123 | 7021212 | EM | JOE@XZ.COM | 2 | 1 | #1 | /JOE | MKTG_US |
| 322 ⟶ JANE | 123123 | 7111212 | PGR | 7123321 | 1 | 2 | #2 | /JANE | SALES_ALL |
| 324 ⟶ BILL | ABCDEF | 7121214 | FAX | FAX | 1 | 4 | #3 | /BILL | MKTG_US_RR |
| CLYDE | ZUESE | 7329053 | EML | EMAIL | 1 | 3 | #4 | /RR/CLYDE | MKTG_EU |
| ZENO | TERIO | 7323231 | PHN | PHONE | 2 | 2 | #5 | /ER/ZENO | SALES_US |

THREAD STRUCTURE

| THREAD ID 401 | ACCS MTHDS 402 | COMM MTHDS 404 | AGND 406 | START/ STOP 408 | PARENT 410 | SUBMISSION PROTOCOL 412 | OWNER 414 |
|---|---|---|---|---|---|---|---|
| MKTG_US (420) | WWW, VR | FAX, EMAIL, VM, DOC | FILEX | DATE1, DATE2 | MKTG | EM MKTG@ NORTEL.COM, FAX 4441236, VM 4441292 | BILL MANAGER |
| MKTG_US_R (422) | 123123 | EMAIL, DOC | FILEC | DATE3, DATE4 | MKTG_US | FILE /MKTG/MSG EM MKTG_US@ NORTEL.COM VM 8363342 | JOE BUSSMAN |

602 — WEBSTORY: DEVELOPMENT_TOOLS

604
AGENDA:

1. TO LOOK AT ISSUES FOR PNS PROJECT.
2. SEEK TO UNDERSTAND RUN-TIME DEVELOPMENT LICENSING REQUIREMENTS FOR PROJECT.
3. TO LOOK AT THE HISTORY OF PREVIOUS LICENSING AGREEMENTS
4. UNDERSTAND HOW S/W IS USED IN PNS APPLICATIONS FOR BOTH OAM DATA BASE AND PNS SUBSCRIBER DATABASE.
5. UNDERSTAND FUTURE DEVELOPMENT NEEDS.
6. LOOK AT THE STATUS OF MIGRATION TO RS/6000
7. INVESTIGATE ALTERNATE TECHNOLOGIES

606
MEMBERS   608 — START AND STOP DATES

INTERNAL         START DATE: 97/08/17

EXTERNAL         STOP DATE: 97/11/01

REVIEW DOCS — 610   612 REFERENCE DOCS   614 LINKS

 REVDOC1    REFDOC1   LICENSE SER. NOS.
                                                              LICENSE SITE 616
CLOSURE CRITERIA
CLOSURE ON THE RUNTIME LICENSING AND DEVELOPMENT ISSUES THREADS 618
DISCUSSION THREADS:   620         622          624
LICENSING HISTORY        RUNTIME LICENSING      DEVELOPMENT ISSUES 626                    630                       638
PREM OBHAN             PAUL BRESCHA              YVONNE LECREC 628                    632                       640
PREM OBHAN             YALCIN SUER               STEVE GANZ 634
                       JEFF CLOUSE
                                                 ← 600
                       636
                       PREM OBHAN                FIG. 6

702 — THREAD: LICENSING HISTORY

704
THREAD AGENDA:
TO CAPTURE ALL PRIOR LICENSING AGREEMENTS AND MISCELLANEOUS INFORMATIONAL COMMUNICATIONS THAT RELATE TO PENDING LICENSING EVENTS AND UPGRADES

706
MEDIA SUBMISSION INFORMATION

708   EMAIL: WEBSTORY@NORTEL.COM
      SUBJECT HEADING: LICENSING_HISTORY

710   DOCUMENTS: WEBSTORY@NORTEL.COM
      SUBJECT HEADING: LICENSING_HISTORY

712   VOICE MAIL: 444 0813 PASSWORD 4567

714   FAX MAIL: 444 1214
      COVER PAGE: LICENSING HISTORY ISSUES

718
THREAD MEMBERS          720 — START AND STOP DATES

INTERNAL                    START DATE: 97/08/17

EXTERNAL                    STOP DATE: 97/11/01

722                    724                              726
REVIEW DOCS        REFERENCE DOCS        LINKS

NONE                   NONE                      NONE

728
THREAD CLOSURE CRITERIA

NO CLOSURE REQUIRED ON THIS THREAD

732 — THREAD: RUNTIME LICENSING

734
THREAD AGENDA:
1. TO UNDERSTAND RUNTIME LICENSING FOR RELEVANT DATA BASESTO
2. TO DETERMINE DEFINITION OF "USER" ON A RUNTIME MACHINE AND DETERMINE HOW MANY "USER" LICENSES ARE REQUIRED

736
MEDIA SUBMISSION INFORMATION

738  EMAIL: WEBSTORY@NORTEL.COM
SUBJECT HEADING: RUNTIME_ LICENSING 740  DOCUMENTS: WEBSTORY@NORTEL.COM
SUBJECT HEADING: RUNTIME_ LICENSING 742  VOICE MAIL: 444 0812 PASSWORD 1234

744  FAX MAIL: 444 1214
COVER PAGE: RUNTIME_ LICENSING

| 746 THREAD MEMBERS | 748 START AND STOP DATES |
|---|---|
| INTERNAL | START DATE: 97/08/17 |
| EXTERNAL | STOP DATE: 97/11/01 |

| 750 REVIEW DOCS | 752 REFERENCE DOCS | 754 LINKS |
|---|---|---|
| NONE | NONE | NONE |

756
THREAD CLOSURE CRITERIA

1. RECOMMENDATION ON DATABASE USAGE METRIC
2. NUMBER OF REQUIRED RUNTIME LICENSES IS DETERMINED

802 — RUNTIME_LICENSING[2].JEFF CLOUSE

JEFF CLOUSE'S VOICE MAIL PLAYED BACK TO THE PARTICIPANT EITHER VIA
    1. THE PARTICIPANT'S DESKPHONE
    2. ON MULTIMEDIA SPEAKERS ON HIS DESKTOP COMPUTER
    3. ON SPEAKERS ON HIS LAPTOP COMPUTER

902 —
RUNTIME_LICENSING[4].CLOSING COMMENTS (PREM OBHAN)

904 —
PAUL BRESHA'S TEAM FOUND THE COMMON DEFINITION OF "USER" DID NOT FIT WELL WITH THE WAY THE DATABASE SOFTWARE WAS UTILIZING THE DATABASE. THEY SUGGESTED A METRIC WHERE THE NUMBER OF RUNTIME "USER" LICENSES CONFIGURED ON THE CO-NAV WOULD EQUAL THE NUMBER OF VOICE-PORTS ON THE CO-NAV HARDWARE. THE LICENSOR AGREED TO THE METRIC. WE SHOULD USE THE SAME METRIC TO DETERMINE THE NUMBER OF USER LICENSES ON A CUSTOMER CO-NAV. JEFF CLOUSE HAS BEEN MADE AWARE OF THIS METRIC AND HAS AGREED TO THE CALCULATIONS.

— 906
CLOSURE ITEMS:

1. DATABASE USAGE METRIC DETERMINED
2. NUMBER OF REQUIRED RUNTIME LICENSES FOR DATABASE SOFTWARE DETERMINED

COMMUNICATION MANAGEMENT SYSTEM HAVING COMMUNICATION THREAD STRUCTURE INCLUDING A PLURALITY OF INTERCONNECTED THREADS

BACKGROUND

1. Technical Field

The present invention relates generally to the management of communications and more particularly to a system and associated method of operation for receiving multimedia communications, for organizing such communications within structures established solely for organizing the communications, notifying users upon receipt of particular types of communications and the distribution of such communications.

2. Related Art

As the communication age has established itself and expanded, the need to expeditiously and economically receive, store and disseminate communications has increased. Electronic mail (email) has facilitated electronic communication between individuals and organizations. Facsimile data transmission has allowed written communications to be transmitted in electronic format and reconstructed into a hard copy format upon a delivery. Further, files containing information may be transmitted and received electronically. Finally, voice communications may be packaged, stored and transmitted over a wired or wireless link to destination where they may be stored for review at a later time. Together, communications containing multiple media types are referred to as multimedia communications.

However, difficulties exist with respect to the ordered dissemination of multimedia communications. With some media of communication, such as email for example, the electronic email communications may be automatically directed to multiple users. Further, in various other systems, voice mail communications and facsimile documents may be multicast to a large number of recipients. Thus, in operation, communication using any of these mediums may be automatically sent to a plurality of destinations.

This ease in directing a single communication to multiple destinations, however, has created significant overhead. For example, in organizations where email has become prevalent, users typically send copies of email to numerous users even though one or more of the recipients has little or no reason to receive the email. Further, facsimiles (faxes) are often transmitted to multiple locations with little or no knowledge as to the value that such fax will provide to the recipient. Thus, even though communications may now be easily disseminated, the overhead created and time lost in review of the communications often outweigh any realized gains.

Additional difficulties arise due to the multiple formats in which communications may be transmitted. For example, faxes, email messages, digitized voice transmissions and electronic files typically require separate interfaces for their creation, transmission and receipt. Separate interfaces are expensive to acquire and difficult for individuals to learn and use. Tools used to direct the transmission of communications are typically non-interactive and difficult operate.

Moreover, for multiple communication types, no universally accepted definition for the successful receipt of a communications exists. Therefore, available systems, even though providing support for multiple types of communications, provide no indication to a sender that a transmitted communication has been received by an intended recipient or recipients. For example, upon sending a file to a recipient's directory, a sender typically must confirm the delivery of the file via verbal communication with the recipient. Faxes may sit for hours or days at a receiving fax machine until they are forwarded via human intervention to the recipient. In any group communication environment, the importance of notification to a recipient often dictates the fashion in which communications are transmitted. Information that would more efficiently be transmitted via a first medium may be transmitted via a second, less desirable medium solely due to notification requirements.

Many types of communications have no indicia of source, topic, purpose time frame and other information that allows a recipient to categorize the communication. Typically, the recipient cannot determine the relative importance of the communication without fully evaluating the communication and therefore typically wastes time in reviewing messages unimportant to him or her. Further, recipients often times review messages only to determine that events referenced within the communication have passed and the communication is no longer relevant to the recipient. The lack of topic and purpose generally precludes the recipient from efficiently retaining and storing the communication for further use.

Still further limitations exist with current communication management tools. Available tools typically do not provide the capability to archive communications in an organized fashion for future use. The tools typically do not provide for the selective dissemination of communications within organizations. Further, dissemination of communications is typically performed without reference to the security of the transmission of such documents.

Thus, there exists a need in the art for a system and associated method of operation for receiving, organizing and disseminating multimedia communications in a logical, expeditious, and economical fashion.

SUMMARY OF THE INVENTION

A group communication management system according to the present invention includes a structure registration interface, a user registration, a submission interface, a communication server and an access interface. The structure registration interface receives structure data and establishes a communication thread structure having a plurality of interconnected threads based upon the structure data. The user registration interface receives user data and establishes user information based upon the user data, the user information linking a user with at least one thread of the plurality of interconnected threads. The submission interface receives communications and at least one desired thread of the plurality of interconnected threads and links the communications with at least some of the plurality of interconnected threads. The communication server establishes links between communications and user information based upon threads of the plurality of interconnected threads. Finally, the access interface receives a communication access request from a user, receives communications from the communication server based upon the communication access request, the user information and thread linkages between the communications and the user information and provides the received communications to the user.

The communication management system may also include a notification interface that notifies a user when a communication is received that is linked to the user by at least one thread. The notification interface may notify a user when a communication has been received that is linked to the user by at least one thread and has a notification priority greater than or equal to a notification priority respective to the user. The notification interface may alternatively notify a user or a user group when a communication has been received that is linked to the user by at least one thread, the notification interface notifying the user according to respective user notification information.

The communication management system supports voice mail communications, electronic mail communications, facsimile communications and electronic files. The communication thread structure may be related to an organization of a business and may include a structure organized according to a hierarchical business structure. Such thread structure allows received messages to be routed among a group of individuals, topics, units within an organization, a group of businesses or such other logical structure that would lend itself to the categorization of communications.

The user information may include user identity, user password, user notification information, user security level, user notification priority, user delivery information and thread participation information. Such user information, used in conjunction with the thread structure, allows the system to properly notify users when pertinent communications are received. In one embodiment, each user may be comprise other than an individual. In such case, the notification interface may notify a user group upon receipt of a pertinent communication.

The submission interface may append communication information to communications, the communication information including communication content, communication time, communication source, communication priority, communication security level and related threads. Further, the access interface may communicate with a user via one communication medium and deliver a communication to the user via another communication medium. Also, the access interface may communicate with the user via a voice connection and deliver a communication to the user via a non-voice connection. Moreover, the access interface and the submission interface may be operable as on-line interfaces.

A method of operating the communication management system includes steps consistent with the operability described above. The system, in one embodiment, is distributed throughout an interconnected network so as to provide access at a number of locations in the interconnected network. Thus, some or all of the elements of the communication management system may be distributed throughout the interconnected network as required.

Moreover, other aspects of the present invention will become apparent with further reference to the drawings and specification which follow.

BRIEF DESCRIPTION OF THE DRAWINGS

FIG. 2 is a diagram illustrating communication information stored by a communication server of the system;

FIG. 3 is a diagram illustrating user information stored by a communication server of the system;

FIG. 4 is a diagram illustrating communications stored by the communication server of the system;

FIG. 6 is a diagram illustrating a display presented by an access interface according to the system according to the present invention;

FIGS. 7A and 7B are diagrams illustrating displays presented by the access interface illustrated during communication accesses;

FIG. 9 is a diagram illustrating a display presented by the access interface explaining satisfied closure criteria for a particular communication thread of the system;

DETAILED DESCRIPTION OF THE DRAWINGS

Figure 1A:
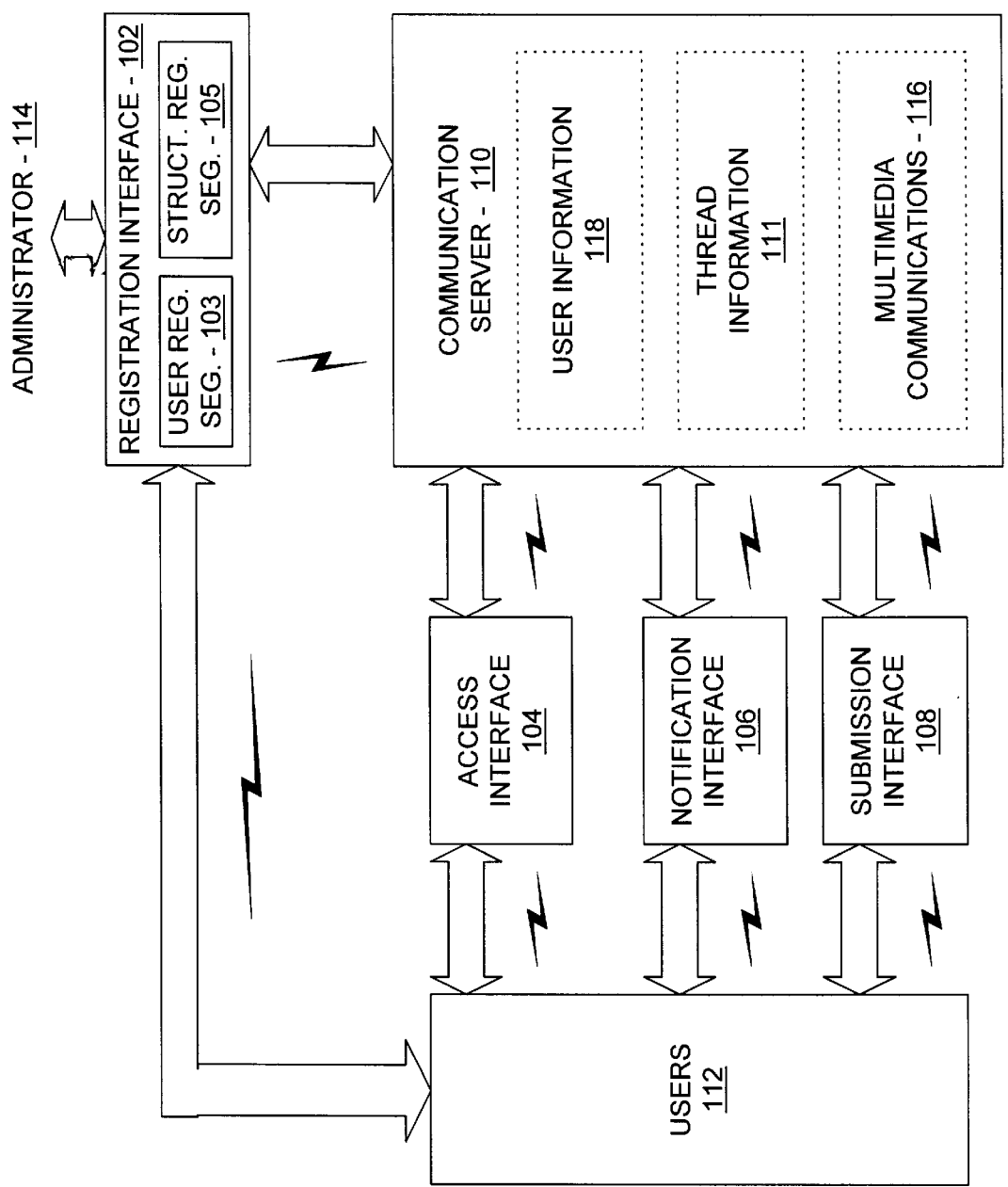
FIG. 1A is a block diagram illustrating a group multimedia communication system ("system") according to the present invention.

FIG. 1 illustrates a group multimedia communication management system ("system") 100 constructed according to the present invention. The system 100 includes a registration interface 102, an access interface 104, a notification interface 106, a submission interface 108, and a communication server 110. The communication server 110 establishes user information 118 in cooperation with a user registration segment 103 of the registration interface 102 based upon input received from a user 112 or administrator 114. Further, the communication server 110 establishes thread information 111 in cooperation with a structure registration segment 105 of the registration interface 102 based upon input received from a user 112 or administrator 114. The registration interface 102 also allows a user 112 or administrator to edit the user information 118 and thread information 111 as desired.

The access interface 104 allows users 112 to access multimedia communications (hereinafter "communications") 116 stored by the communication server 110. The notification interface 106 provides notification to users 112 when communications are received by the communication server 110. The submission interface 108 allows a user 112 to interface with the communication server 110 in submitting communications to the system 100. The access interface 104, the notification interface 106 and the submission interface 108 will be described further herein with respect to the FIGS.

The components of the system 100 operate in cooperation to receive the communications 116 via the submission interface 108, to selectively notify users 112 upon receipt of the communications 116 via the notification interface 106 and to selectively allow users 112 to access the communications 116 via the access interface 104. The thread information 111 is employed by the system 100 to cross-reference user information 111 with the communications to allow submissions and access in a desired manner. Depending upon the embodiment, the components comprising the system 100 may reside upon a single computer system or may be distributed among a plurality of computer systems. Access to the system 100 may be had by wired or wireless link as illustrated and may be had via a telephone, fax, computer or another electronic link that allows a user 112 to access the components of the system 100.

The thread information 111, established by the administrator 114 or a user 112 via the structure registration segment 105 of the registration interface 102 typically includes a tree structure organized as a hierarchy. As will be described further herein, the thread information 111 structure may be modeled after an organizational structure of a company, an agenda of a group, an organization of a pending project, or such other structure that lends itself for use in the organization of communications. Thus, the system 100 of the present invention provides a mechanism and associated methodology of operation providing an efficient and organized organization of communications.

Figure 1B:
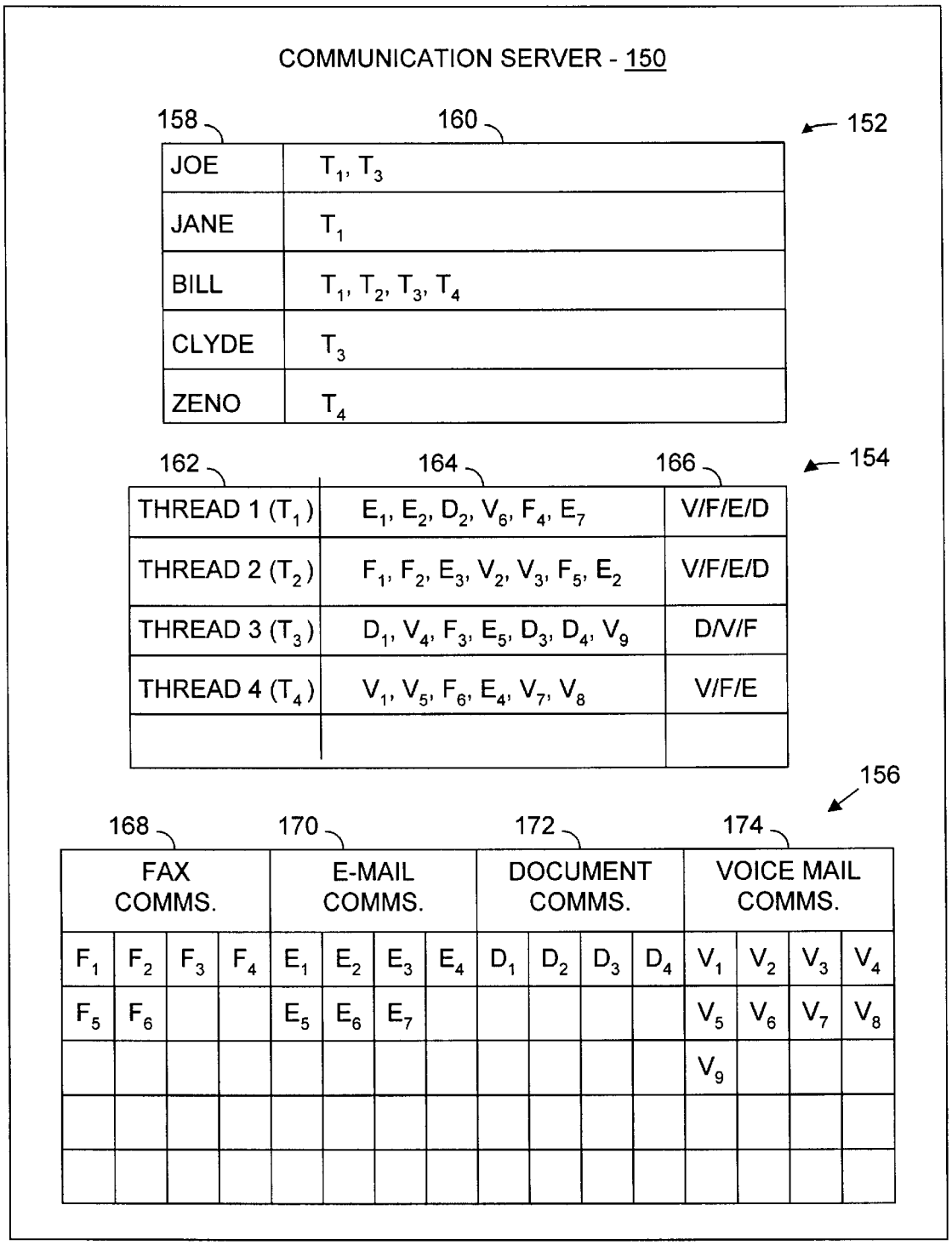
FIG. 1B is a diagram conceptually illustrating organization of user information, thread information and multimedia communications according to the system according to the present invention.

FIG. 1B illustrates the organization of an exemplary communication server 150 constructed according to the present invention. The server 150 includes user information 152, thread information 154 and communications 156. In the example, the users 158 JOE, JANE, BILL, CLYDE and ZENO are registered and have access to the system 150. Each of the users 158 is also associated with one or more threads represented in the thread information 154. As shown, threads 1 through 4 (denoted as $T_1$, $T_2$, $T_3$ and $T_4$) have been previously established by an user or administrator. As is illustrated, threads $T_1$, and $T_3$ are associated with user JOE within thread associations 160 of the user information 160. As is also shown, each of the users 158 is associated with at least one thread in the thread association portion 160 of the user information 152. However, as is also shown, the user information 152 need not associate the users 158 with any of the communications 156. The user information 152 may include further additional information as will be described further herein.

The thread information 154 also provides communication associations 164 and valid communication types 154 for each thread 162. For example, thread $T_2$ associates with communications $F_1$, $F_2$, $E_3$, $V_2$, $V_3$, $F_5$ and $E_2$ and may receive voice mail, facsimile (fax), email and document communications. As a further example, thread $T_3$ associates with communications $V_1$, $V_5$, $F_6$, $E4$, $V_7$ and $V_8$ and may receive only voice mail, fax and email communications. The thread information may also include further information as will be described herein.

The communications 116 include fax communications 168, e-mail communications 170, document communications 172 and voice mail communications 174. As shown, fax communications 168 $F_1$ through $F_6$, e-mail communications $E_1$, through $E_7$, document communications $D_1$ through $D_5$ and voice mail communications $V_1$ through $V_9$ are stored as communications 116. As will be described further herein, further information may be appended to the communications 158 as may prove useful in managing the communications.

FIG. 2 illustrates communication information 200 that further describes the communications referenced as numeral 116 of FIG. 1A and numeral 156 of FIG. 1B. Communication information 200 includes communication contents 202, a time stamp 203, a source 204, a notification priority 206, a security level 208, and associated thread identifiers 210 for each communication. Types of communications supported by the system 100 of the present invention include at least faxes, emails, voice communications, files, and other types of information that are supported by an electronic system.

Communication 212, for example, is a fax received on May 5, 1997 at time 7:07 from a source having telephone number 707-0707. The communication 212 has associated with it two different threads, MKTG_US and MKTG_CAN. Thus, the particular communication is associated with two separate threads. As will be further described herein, threads represent one or more particular structure destinations for each communication. For example, MKTG_US represents that communication 212 has a thread destination for Marketing, United States. Further, communication 212 has a thread destination MKTG_CAN which represents that the associated thread is Marketing Canada. Communication 214, for example, is an email message having time stamp May 5, 1997 at 12:32 sent by joe@io.com and having thread destinations SALES_ALL and MKTG_ALL. Likewise, records 216, 218, and 210 also have associated time stamps, sources, thread identifiers, notification priorities and security levels.

In addition, notification priorities 206 associate with each communication and identify the relative notification priority of the communication. On a scale of 1 to 5, 1 has the lowest notification priority while 5 has the highest notification priority. Such notification priorities will be further described herein where appropriate. Security levels 208 associate with each communication and provide a security level required for a user to access the related communication upon an access via the access interface 104.

FIG. 3 illustrates user information 300 generated by the registration interface 102 of FIG. 1 and stored as user information 118 of the communication server 110 as illustrated in FIG. 1. Only those users that have been registered may access communications stored within the system. User information includes the user's ID 302, the user's password 304, the user's facsimile number 306, the user's notification address, the user's security level 310, the user's notification priority 312, the user's phone number 314, the user's home directory 316, and the user's associated thread IDs 318.

With respect to user information record 320, the user 302 is JOE and the user has password XYZ123. Thus, user information record 320 identifies JOE as a user having access to the system 100 with appropriate credentials. Upon JOE's access of the system through the access interface 104 with his user ID, JOE gives his password XYZ123 and obtains a level of access corresponding to his security level to thread identified as his associated thread IDs. JOE has access to all communications associated with thread ID MKTG_US.

The notification information 308 method and address for JOE requires notification by email at JOE's email address of JOE@MY_CO.com. JOE's associated thread IDs include MKTG_US. Thus, when communications are received by the system 100 that are associated with thread ID MKTG_US with a notification priority of 1 or higher, the system 100 via the notification interface 106 sends notification to JOE at JOE's email address that a message has been received for his attention.

With other users, notification 106 may be made using other techniques. For example, notification may occur for JANE of record 322 via JANE's pager number 712-1213. Further, for example, with reference to BILL of record 324, notification of received communications is sent to BILL at his facsimile machine number 712-3456. In each of these situations, the system 100 will notify a particular user upon receipt of communication that satisfies the criterion established for the user. Note that BILL's notification priority is 4. Thus, BILL is notified only when communications received have a notification priority level of 4 or higher.

The security level 310 established for each user determines the rights the particular user has in viewing communications within his or her designated threads. For example, user JOE at record 320 has a security level of 1, the lowest level, while JANE at record 322 has a security level of 3 and BILL at record 324 has a security level 4. Communications received having a particular security level may only be viewed by users having an equal or greater security level number. Thus, of those users having access to the same thread, not all of the users may view all communications associated with the thread. Only those users having access to the thread and having a security level equal to or greater than the security level of the communication may view the communication.

Notification priority 312 assigned to each user determines in part when notifications will be sent to users that communications are present. For example, BILL at record 324 has a notification priority level of 4. Thus, only those combinations received by the system 100 having a notification priority level of 4 or higher and categorized within the structure at threads corresponding to BILL will cause a notification to be sent to BILL that the communication is present. Those communications with a lower notification priority will not cause a notification message to be sent to JOE via the notification interface 106.

User information for each user includes a phone number 314 at which the user receives voice mail communications. JOE at record 320 has a telephone number #1 (in this case, #1 corresponds to 314/702-2213). Thus, any voice communications that are sent to JOE are be directed to the phone number 314/702-2213, such phone number corresponding to his handset or to his computer system if his computer is configured to handle voice messaging.

User information for each user also includes a home directory 316 at which the user receives data files. Thus, for example, BILL at record 324 receives his data files at his home directory of BILL in the home computer network in which the system 100 operates. In other examples, the home directory may be a world wide web (WWW) address or Internet address at which BILL could receive data files. In still further examples, the home directory could comprise a central location established for receiving related data files.

Of course additional information may be provided for delivery of voice mail, email, data files and faxes. The user may have the ability to deliver any type of communication to multiple locations. For example, the user may travel frequently and access the system from various physical locations. In such case, upon login, the system 100 may request location and delivery information from the user or automatically detect the user's presence at a particular location. In such case, the system 100 would temporarily modify the delivery information to conform to the user's location, deliver requested communications to the user's temporary location and reset the delivery information to default values upon termination of the user's connection at the location. Further, in other cases, the user may desire to have communications delivered to alternate locations other than his current location. In these cases as well, the system 100 may modify the delivery information for the user for the current communication of set of communications.

The threads 318 for each user identify those particular thread IDs to which the respective user has access. For example, JOE at record 320 has access to communications associated with threads MKTG_US and SALES_ALL. Thus, any communications received having a thread destination of MKTG_US or SALES_ALL and with a security level lesser or equal to the security level for user JOE may be received by JOE. Thus, the thread identifiers associated with each user cross reference the particular user to threads created within the structure of the system 100.

FIG. 4 illustrates a thread structure 400 as was previously illustrated as the thread information 111 within the communication server 110 of FIG. 1A. The establishment of a particular communication structure in which threads are organized will be described further herein. However, once such structure is established, it is stored as the thread information 111 as illustrated in FIG. 1. Each record in the thread structure 400 includes a thread identifier 401, at least one access method 402 supported by the particular thread, at least one communication method 404 supported by the thread, the agenda 406 of the thread, start and stop dates 408 for the thread, a parent 410 of the thread (if any), submission protocols 412 for the thread and the owner 414 of the thread.

Thread IDs are established via the structure registration segment 105 of the registration interface 102 by the owner of the thread or by an authorized agent of the owner, such person perhaps the administrator 114 or a particular user 112. For example, with reference to a thread of record 420, the thread ID is MKTG_US and the thread supports web access and voice recognition interface. Communication methods supported by the thread of record 420 includes facsimile, email, voice mail, and documents. The agenda of the thread of record 420 relates to marketing and includes a pointer to a more detailed description of the agenda. The starting and stopping dates of the thread of record 420 are Jan. 1, 1997 and Jan. 1, 2000, respectively. The parent thread of the thread of record 420 is MKTG.

Multiple thread structures may be supported by the system 100 of the present invention. Each thread structure includes a root. Thus, a thread which is a root will have no parent and a default root will be placed in the parent field 410 for the associated thread record. However, all other threads in the particular thread structure will have a parent. Messages intended for a particular thread having children may be directed such as to deliver the communication to each thread under the parent. Such children may include not only children but also grandchildren and great grandchildren, etc., until the thread structure has been completely covered.

Each thread record also includes a submission protocol 412 that directs submissions intended for the thread. For example, the thread of record 420 directs email to be sent at MKTG_US@NORTEL.COM, faxes to be sent to telephone number 444-1236, voice mail to be sent to telephone number 444-1292 and documents to be delivered to location /MKTG/MSG. Thus, the submission protocol 412 for each thread dictates how communications are to be delivered to the particular thread. Such submission protocols are provided to related users 112 when the users 112 become linked to the thread and are used by the submission interface 108 in directing submissions of communications from users 112 for the particular thread.

The owner 414 of thread of record 420 is BILL MANAGER. Thus, only BILL MANAGER and his authorized agents may alter the data contained in record 420. Such owner 414 of the particular record 420 may be an administrator for communications used within the system for the particular group or another user.

Figure 5:
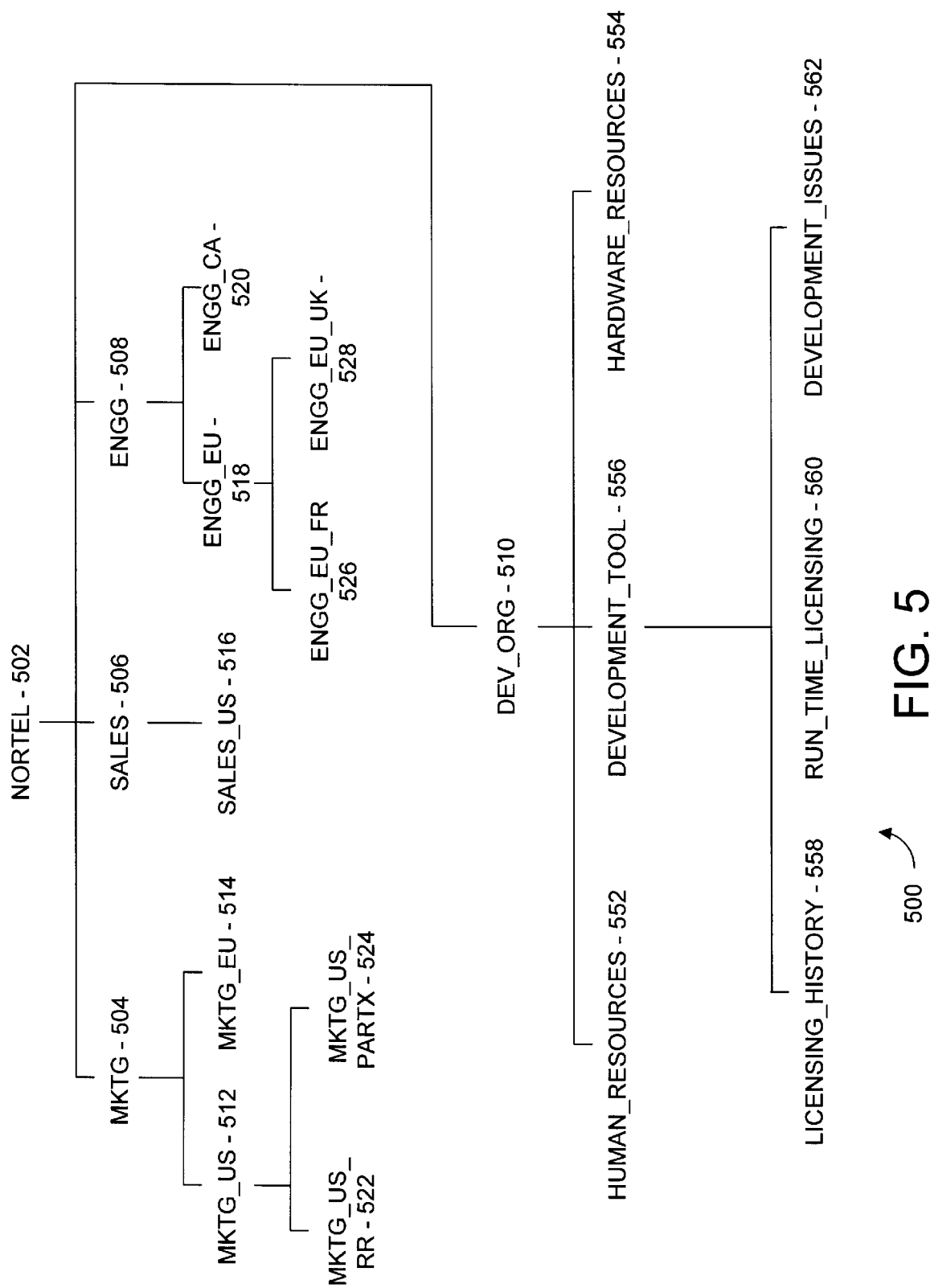
FIG. 5 is a diagram illustrating a particular thread structure implemented according to the present invention.

FIG. 5 illustrates a particular thread structure that may be employed in the system of the present invention. The thread structure 500 is loosely based upon the organization of a particular corporation, Nortel for example. As illustrated, entity NORTEL 502 is the root of the particular thread structure. Under the root 502 NORTEL are marketing (MKTG) 504, SALES 506, engineering (ENGG) 508, and development (DEV_ORG) 510. Further, under thread MKTG 504 resides MKTG_US 512, and MKTG_EU 514. Further, under thread MKTG_US 512 reside threads MKTG_US_RR 522 and MKTG_US_PARTX 524. Further, thread SALES_US 516 resides under thread SALES 506. Likewise, thread ENGG_EU 518 and ENGG_CA 520 reside under the thread ENGG 508. Finally, as illustrated in the exemplary thread structure, thread ENGG_EU_FR 526 and thread ENGG_EU_UK 528 reside under thread ENGG_EU 518.

Thus, the thread structure illustrated in FIG. 5 represents loosely a portion of a corporate structure in conjunction with which communications may be organized. In a particular example of a system 100 according to the present invention a user of the system 100 may be a associated with thread MKTG_US_RR 522. Thus, when communications received that are associated with thread MKTG_US_RR 522, the user may be notified if the particular communication has a notification priority equal to or greater than the user's notification priority. In another example, a user is associated with thread MKTG 504 and has access to all communications intended for thread MKTG 504 and all children threads of thread MKTG 504. In some organizations, with a large number of children of thread MKTG 504 existing, the large number of thread associations would overwhelm a particular user with communications. Thus, in such a situation, the user may choose to disregard some or all of the communications or to be associated with a thread further down in the thread structure.

Under thread DEV_ORG 510 reside threads HUMAN_RESOURCES 552, DEVELOPMENT_TOOLS 556, and HARDWARE_RESOURCES 554. Further, under thread DEVELOPMENT_TOOLS 556 reside threads LICENSING_HISTORY 558, RUNTIME—LICENSING 560, and DEVELOPMENT—ISSUES 562. Thus, the illustrated thread structure is generated to provide an efficient and logical organization of communications received within the system 100 and not solely based upon the organization of a company implementing the system 100.

FIG. 6 illustrates an exemplary access interface 104 for the thread structures illustrated in FIG. 5. The access interface 104 includes a title which is WEBSTORY: DEV_TOOLS. Thus, such access interface 104 would be presented to a user that is accessing thread DEVELOPMENT_TOOLS 556 of FIG. 5b. Upon access to such DEVELOPMENT_TOOLS thread 556, the access interface presents the user with the title of the thread 602, the agenda 604 for the thread, group membership 606, start and stop dates 608, review documents 610 for the thread 6, reference documents 612 for the thread and useful links 614 associated with the thread.

The agenda 604 associated with the thread identifies a particular set of concepts, ideas, goals or other parameters commonly associated with the particular thread. Such agenda 604 provides a commonality that allows for the categorization and storage of communications in the system 100. Members 606 associated with the thread may be subcategorized into internal members of the thread and external members of the thread. Such access to membership lists may be had by selecting the internal or external identifiers. Start and stop dates 608 identify the first and last date available for submissions and accesses to the particular thread. Thus, for example, with reference to thread DEVELOPMENT_TOOLS the start date is Aug. 17, 1997, and the stop date Nov. 1, 1997. Thus, the thread DEVELOPMENT_TOOLS will only remain valid for such period of time. After such period of time, the thread may be deleted from the thread structure and no access may be had thereafter. Of course, in other embodiments, submissions could be rejected for the thread while the communications linked to the thread could remain for archive purposes.

The review documents 610, reference documents 612, and links 614 provide information to a user who accesses the thread DEVELOPMENT_TOOLS. For example, review documents 610 may include readings required for a user of a particular thread to become versed in the agenda of the thread and goals associated therewith. Reference documents 612 may include additional readings suggested for the user but not necessarily required for the user to understand the agenda 604 of the particular thread. Links 614 identify additional threads that may be useful in use of the particular thread DEVELOPMENT_TOOLS. However, such links do not necessarily represent parent or children to the particular thread.

Closure criteria 616 illustrates parameters that could affect the continued existence of the thread within the thread structure. For example, with respect to thread DEVELOPMENT_TOOLS, the closure criteria could be met when such tasks were completed, with such tasks identified under the agenda 604. Discussion thread 618 identify those children threads of the thread DEVELOPMENT_TOOLS. For example, the thread DEVELOPMENT_TOOLS includes sub-threads LICENSING_HISTORY 620, RUNTIME_LICENSING 622 and DEVELOPMENT_ISSUES 624. In each of these discussion threads, different communications exist to which the user has access. Thus, under LICENSING_HISTORY thread 620 Prem Obhan has sourced an email communication 626 and a document 628 to the particular discussion thread. Because these particular communications are illustrated to the user, the user's priority is sufficient to allow the user access to the communications. Further, under the RUNTIME_LICENSING discussion thread 622 Paul Bresha has sourced a voice mail 630, Yalsin Suer has sourced a voice mail 632, Jeff Clouse has sourced an email 634 and Prem Obhan has submitted a closure 636. Thus, the RUNTIME_LICENSING discussion thread 622 has been closed by Prem Obhan based upon respective closure criteria. Further, discussion threads DEVELOPMENT_ISSUES thread 624 include email from Yvonne LaCrec 638 and a facsimile from Steve Ganz 640. Thus, the documents associated with the discussion thread 620, 622, and 624 to which the particular user has access are illustrated so that the user may access the communications.

As illustrated, the display also indicates which discussion threads 618 have been closed. Threads that have had their closure criteria satisfied include communications linked by vertical lines while threads that are not closed include communications linked by non-vertical lines. For example, discussion thread LICENSING_HISTORY 620 includes two communications linked by non-vertical lines. Such linkage indicates that discussion thread LICENSING_

HISTORY 620 is not closed and may receive further communications. However, discussion thread RUNTIME_LICENSING includes communications linked by vertical lines, such vertical lines linking the communications indicating that the discussion thread is closed. Such closure is confirmed by the by the closure icon 636 submitted by Prem Obhan.

FIG. 7A illustrates a particular thread 702 entitled LICENSING_HISTORY that may have been accessed via the LICENSING_HISTORY link 620 of the display of FIG. 6. As illustrated, the LICENSING_HISTORY thread 702 includes a thread agenda for the LICENSING_HISTORY thread 702, media Information 706, thread members 718, start and stop dates 720, review documents 722, reference documents 724, links 726, and thread closure criteria 728. The thread agenda 704 is smaller than the thread agenda listed for thread DEV_TOOLS of FIG. 6. Such smaller thread agenda represents such smaller goals associated with the particular thread LICENSING_HISTORY 702. Media submission information 706 includes an email address 708 for the submission of email, a documents submission address 710 for the submission of documents, voice mail address 712 for the submission of voice mail and a facsimile mail number 714 for the submission of facsimiles.

Further as shown, links to thread members 718 may be taken to show internal members and external members. Further, the start and stop dates 720 indicate that the starting date for the thread is Aug. 17, 1997 and that the ending date for the thread is Nov. 1, 1997. Review documents 722, reference documents 724, and links 726 provide no additional links to information for the particular thread 700. No thread closure criteria 728 exists for the particular thread 700. Thus, the thread 700 may only be closed at the ending date or by the owner of the thread through intervention via the structure registration segment 105 of the registration interface 102.

FIG. 7B illustrates information viewed via the submission interface 108 of the system 100 of FIG. 1 for the thread RUNTIME_LICENSING 730. As is shown, the submission interface for the thread RUNTIME_LICENSING shows the title 732 of the thread, the thread agenda 734, submission information 736, has a link to thread members 746 and the start and stop dates 748 for the thread. The submission interface for the thread RUNTIME_LICENSING futher illustrates that no review documents 750, reference documents 752 or links 754 exist for the thread. Finally, the submission interface for the thread RUNTIME_LICENSING illustrates respective closure criteria 756.

As was the case with FIG. 7A, the information presented in FIG. 7B shows such information as would be presented to a particular user 112 via the submission interface 108 of FIG. 1. Note, however, that the subject headings associated with the email 738 and document 740 submission information differ from those of the email 708 and document submission information 720 for thread 700 LICENSING_HISTORY. Such submission information, when used by a user to submit communications to the system 100, causes such communications to associate with the respective threads.

Figure 8:
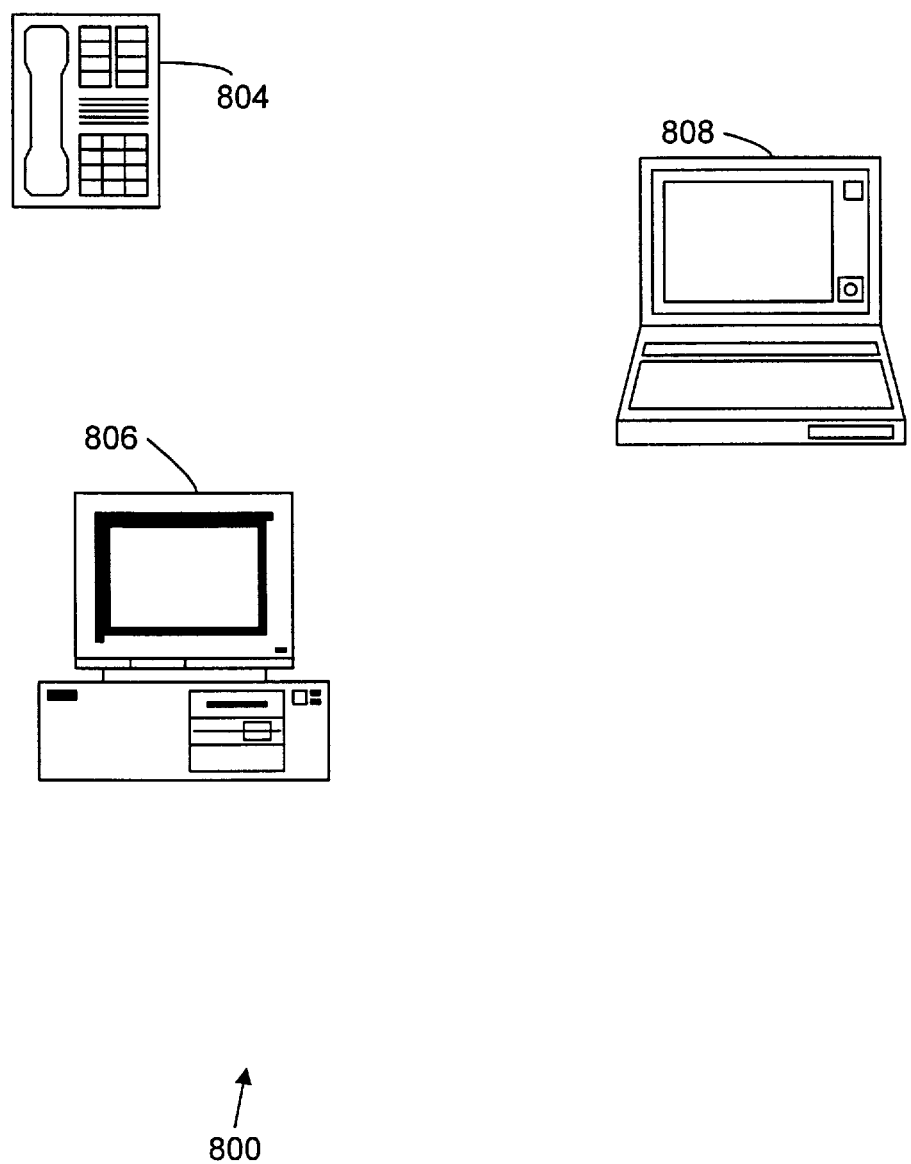
FIG. 8 is a diagram illustrating a display presented by an access interface of the system during retrieval voice mail messages.

FIG. 8 illustrates a display 800 presented to a user by the access interface 104 of FIG. 1 when a user seeks to receive voice mail 634 from Jeff Clouse associated with the thread RUNTIME_LICENSING. Such screen may have been accessed by selecting the voice mail 634 submitted by Jeff Clouse under the RUNTIME_LICENSING discussion thread 622 of the display 600 illustrated with reference to FIG. 6. Thus, the display 800 reference the discussion thread RUNTIME_LICENSING and Jeff Clouse as a title 802 and offers the user options for receiving the voice mail. Of course, the display is only presented to a user having access to the voice mail 634 via both access to the discussion thread RUNTIME_LICENSING and sufficient security clearance to view the voice mail 634.

A user, by selecting an icon or item from the screen 800 selects a method of delivery for the voice mail. As shown, a telephone icon 804, a desktop computer icon 806, and a laptop computer icon 808 are presented to the user. By selecting the appropriate icon, the voice mail message from Jeff Clouse will be transmitted to the appropriate component for the particular user. As was discussed with reference to FIG. As will be remembered with respect to FIG. 3 illustrating the user information 300, each user may have an associated telephone number, home directory or multiple phone numbers and home directories for delivery of various communications. Thus, when a user selects one of the icons illustrated in FIG. 8, the access interface 104 routes communications according to the selection made by the user and user information contained for the particular user. For example, if the user selected the telephone icon 804, the access interface 104 would route the phone mail message to the appropriate telephone number. However, if the user selected the desktop icon 806 or the laptop icon 808, the access interface 104 would route the voice message to one of the computers for playback. Thus, the system of the present invention provides a generic interface for all types of communications that would be received by a particular user. In the same fashion, the system may present options for receiving documents, facsimiles, and electronic mail for those communications present in associated threads.

FIG. 9 illustrates a display 900 that may be presented to a user when apprising the user of closing comments for a particular communication thread. As is shown, the display 900 presents the user with a thread title 904 identifying the particular communication thread RUNTIME_LICENSING and information 904 indicating why the communication thread is closed. Further, the screen identifies particular closure items 906 that were received to satisfy the closure requirements. As was previously discussed, closure of a particular thread may be performed by the owner of the thread or upon the achievement of certain closure criteria for the thread. In this situation, the thread RUNTIME_LICENSING was closed based upon particular events occurring with respect to the thread. Closing comments for particular threads may also be presented in other interfaces, the interface discussed with reference to FIG. 7B, for example.

Figure 10:
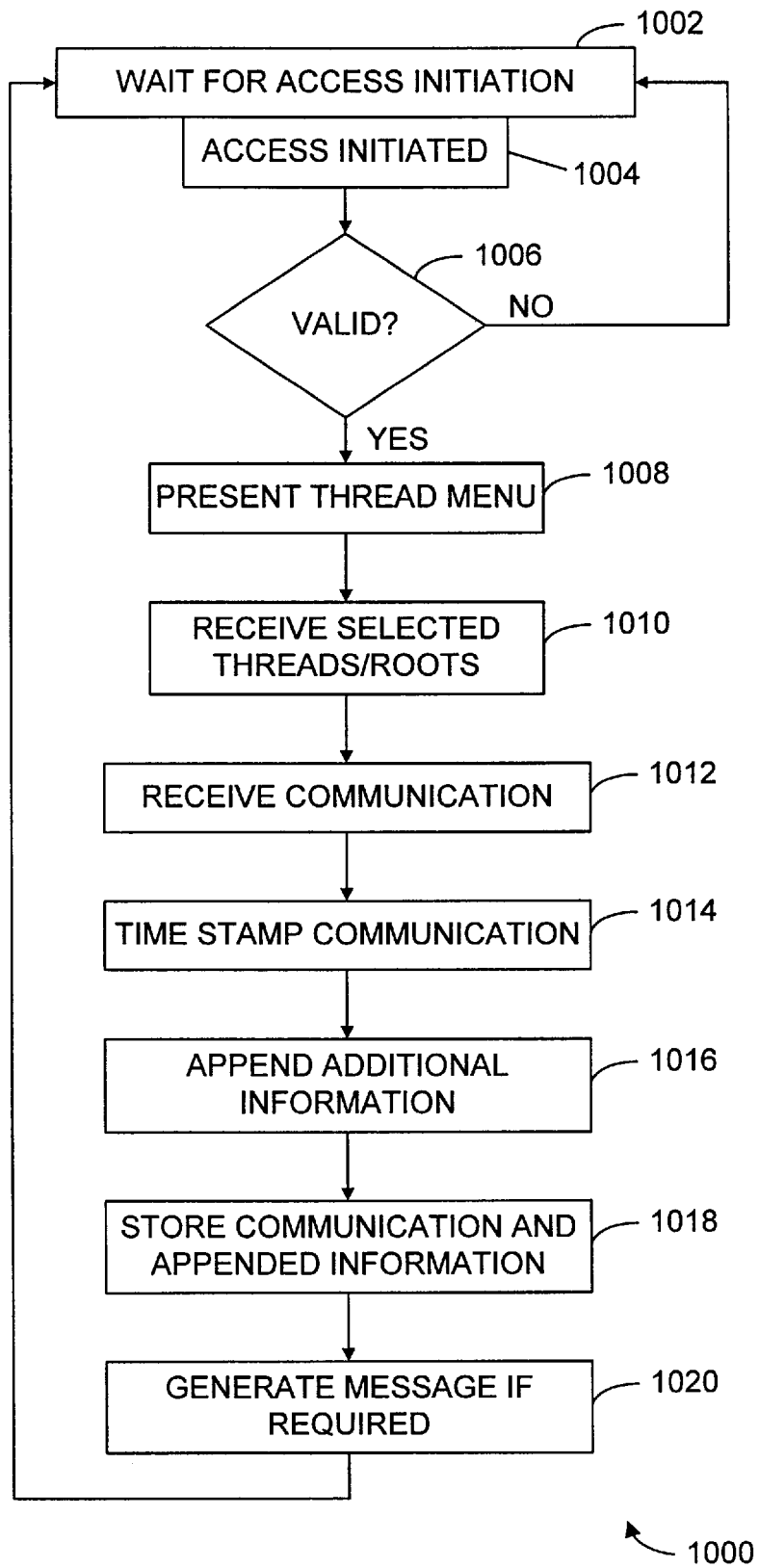
FIG. 10 is a flow diagram illustrating operation on the submission interface of the system according to the present invention in receiving multimedia communications.

FIG. 10 is a flow chart illustrating operation 1000 of the submission interface 108 of FIG. 1. Operation commences at step 1002 wherein the submission interface waits for access to be initiated by a user. Upon access of the submission interface at step 1004, the submission interface 108 determines whether the access is valid at step 1006. Such validation may be accomplished by cross referencing the user name and password to the user information 118. If the access is valid, operation proceeds to step 1008 while an invalid access causes a return to step 1002. At step 1008, the submission interface presents a menu of threads available to the particular user for submissions. In such case, the submission interface 108 may operate in conjunction with the communication server 110 to cross reference the thread information 111 with the user's accessible threads determined via the user information 118. However, those threads presented to the user may be chosen based upon the content of the communication to be submitted by the user. For example, the system may request that the user submit a topic sentence describing the communication. Based upon this topic sentence, the system would then select a plurality of threads related to that topic. After such determination of which threads the user may access for the submission, a display of such threads is presented to the user.

Next, at step 1010, the user selects one or more threads with which to associate the communication to be submitted. Then, at step 1012, the user submits the communication in conjunction with the identified thread or threads. Upon receipt of the communication, the submission interface 108 stamps the communication with a time of receipt at step 1014. Then, the submission interface and the communication server 110 append any additional information to the communication as may be required. Such appended information may include security level information received from the user and/or a notification priority level. Then, at step 1018 the information processor 110 stores the communication and the appended information within the communications 116. Finally, at step 1020, a message is generated and delivered to the user if required. Such message could include notification that the submission occurred correctly or that an error had occurred in submission. However, communications need not be transmitted to the user in all operating situations. From step 1020, operation of the submission interface 108 returns to step 1002 to await a subsequent access.

Figure 11:
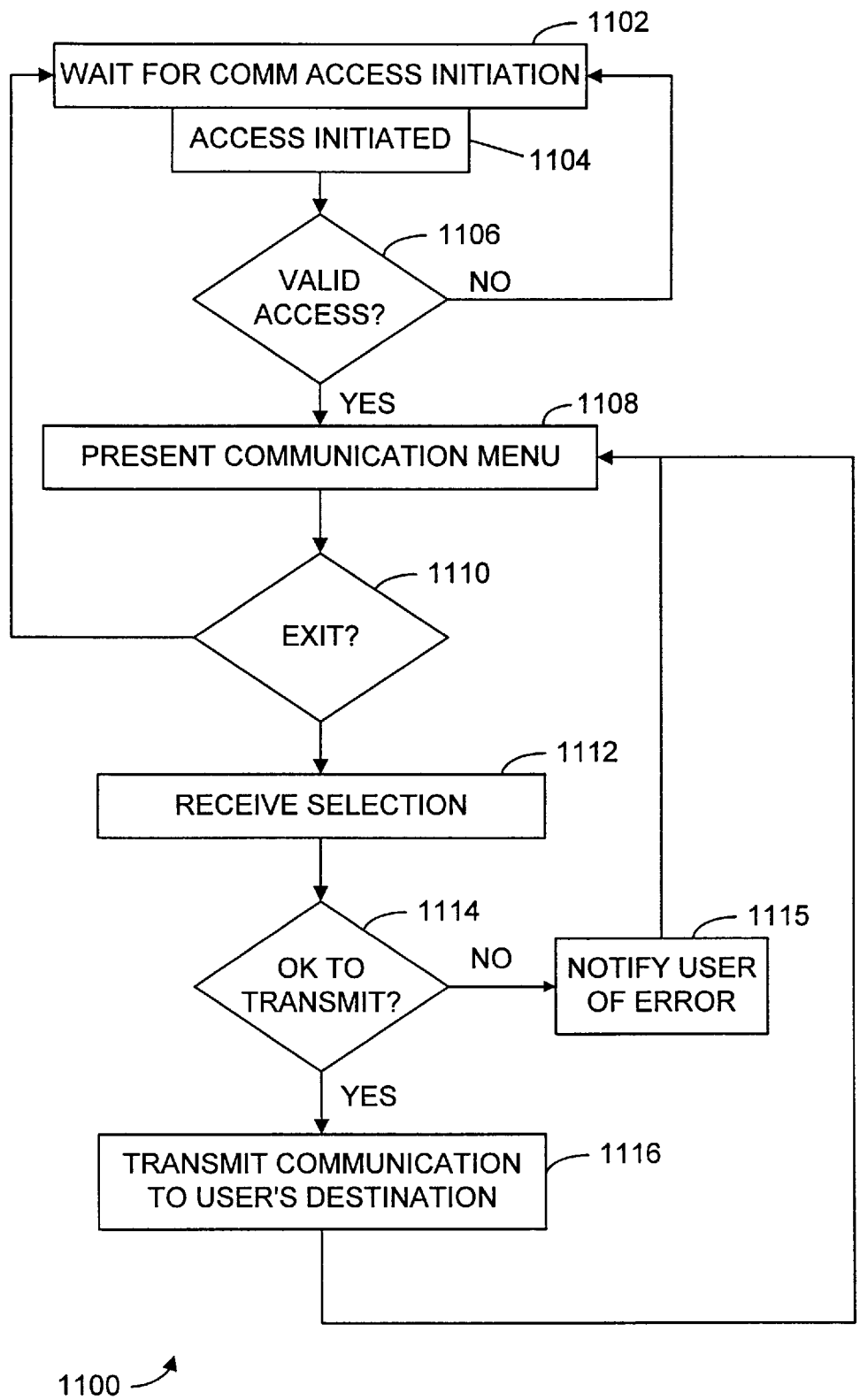
FIG. 11 is a flow diagram illustrating operation of the access interface of the system during transmission of multimedia communications to a user.

FIG. 11 illustrates operation 1100 of the access interface 104 of FIG. 1 during access by a user. At step 1102 the access interface 104 awaits access to be initiated by a user. Upon initiation of access at step 1104, the access interface 104, in conjunction with the communication server 110 determines whether such access is valid at step 1106. If the access was determined valid at step 1106, operation proceeds to step 1108. If the access was not valid at step 1106, operation proceeds to step 1102. Upon invalid access, the access interface 104, in conjunction with the communication server 110 may notify the administrator that an invalid access attempt had occurred.

At step 1108, the access interface 104, operating in conjunction with the communication server 110, presents a menu of communications to the user that the user may access. The menu of communications may include a display such at that described with reference to FIG. 6 wherein a menu of available communications and additional information is presented to the user. At step 1110, the user may choose to exit operation of the access interface. Upon an exit request at step 1110, operation proceeds to step 1102 wherein the access interface awaits further access attempts. In one embodiment, such as that described with reference to FIG. 6, additional options may be presented to the user. For example, the user may pass to other threads, membership information, review documents, reference documents to other such information as was described with reference to FIG. 6. Operation of the access interface 104 in such cases was described with reference to FIG. 6 and is not further described with reference to FIG. 11.

From step 1110, if the user does not exit, the access interface 104 receives the user's selection of particular communication(s). The communication server 110 then determines whether such selection is valid and whether it is OK to transmit the selection to the user at step 1114. If transmission of the communication(s) is not proper for any reason, operation proceeds to step 1115 wherein the user is notified with an error message and operation proceeds again to step 1108. However if it is OK to transmit such communication(s) at step 1114, operation proceeds to step 1116 wherein the selected communication(s) is transmitted to the user at a selected destination. Such delivery may be accomplished with reference to an interface display such as the one illustrated with reference to FIG. 8 or may be directly delivered when requested via mouse click on an appropriate icon as illustrated with reference to FIG. 6. In either case, the communication server 110 and the access interface 104 operate in cooperation to determine a correct destination and mode of delivery for the communication(s).

Thus, the operation of the access interface 104 allows users of the system 100 to access those communications to which they are privileged, allows the users to access those particular threads to which they are privileged and allows the users to access such other accessible information provided.

Figure 12A:
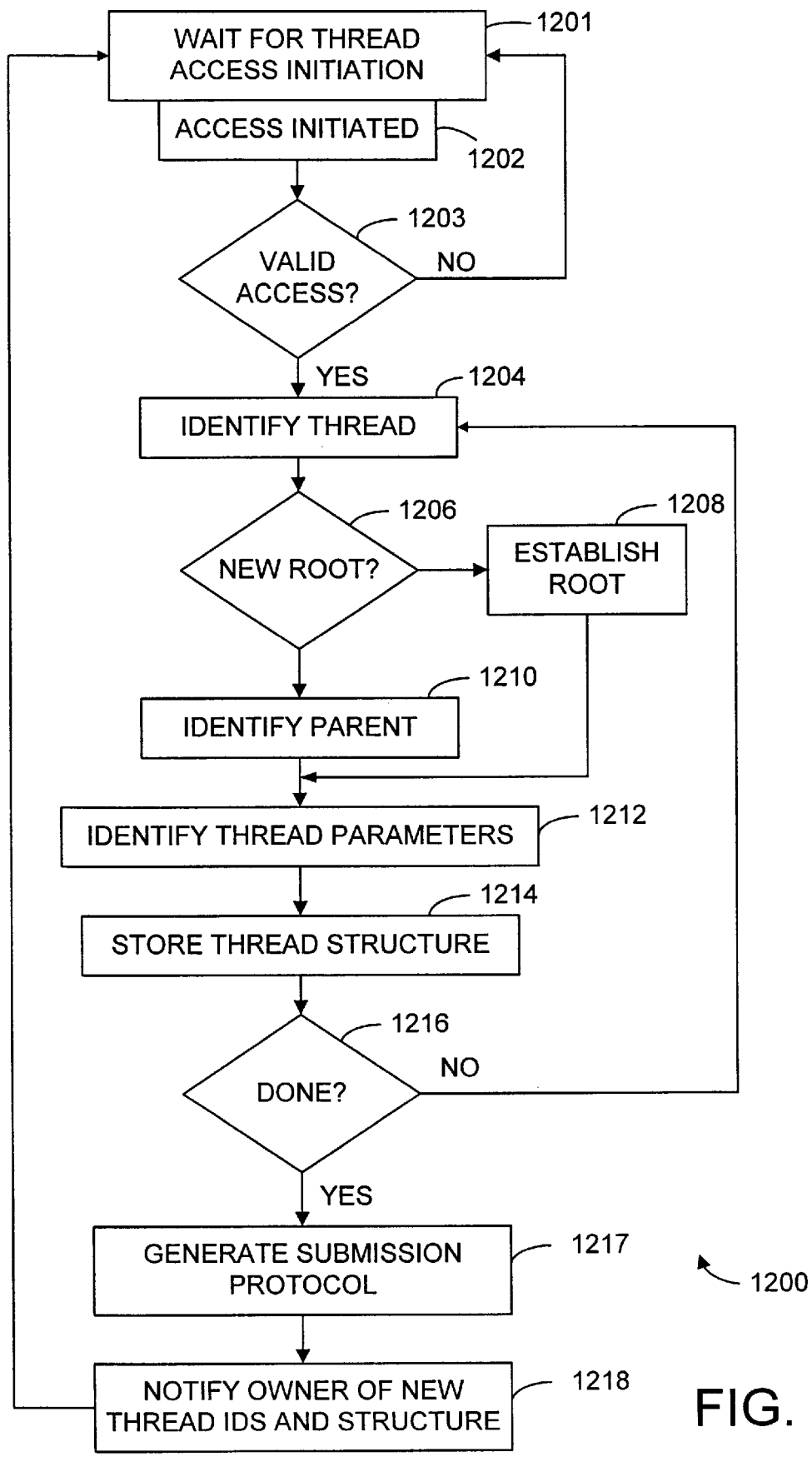
FIGS. 12A and 12B are flow diagrams illustrating operation of the registration interface of the group communication system establishing and editing threads.

FIG. 12A illustrates operation 1200 of the structure registration segment 105 of the registration interface 102 in establishing threads. Upon commencement of operation, the registration interface 102 awaits access by a user or administrator 114 at step 1201. Upon such initiation of access at step 1202, operation proceeds to step 1203 wherein the registration interface 102, in conjunction with the communication server 110, validates the access via reference to the thread information 111 and/or user information 118. The user information 118 identifies all users having access to the system and may also identify users having rights to establish thread information 111. The user information 118 may also identify those users that have administrator 114 status or, in other cases, the administrators of the system that have rights to establish thread information 111.

If the access is unsuccessful at step 1203, operation proceeds again to step 1201 wherein the registration interface awaits an access. However, if authentication is successful at step 1203, operation proceeds to step 1204 wherein the user or administrator identifies a thread to be established. At such step 1204, the registration interface may present the administrator 114 or user 112 with an existent structure from which the administrator 114 or user 112 works. Next, at step 1206, the registration interface 102 determines whether the identified thread at step 1204 is a new root for a structure. If the identified thread is a new root, then the registration interface 102 establishes a new root at step 1208. However, if the identified thread is not a new root at step 1206, the registration interface 102 requires that user or administrator to identify the thread's parent at step 1210. Such identification may be performed in an interactive fashion with the administrator 114 or user 112.

Next, from both steps 1208 and 1210, operation proceeds to step 1212 wherein user identifies the thread parameters. Such thread parameters were previously discussed with respect to FIG. 4 and may include those described and additional parameters as well. Then, from step 1212, operation proceeds to step 1214 wherein the new thread is stored in the structure 111 of the communication server 110 of FIG. 1. Then, at step 1216, a determination is made as to whether the user or administrator is done adding threads. If the administrator is not done, operation proceeds to step 1204 where another thread is identified. However, if the administrator is done at step 1216, the owner of the threads is notified with the particular threads identified along with such additional thread information as is appropriate at step 1218. From step 1218, operation proceeds to step 1201 wherein the structure registration segment 105 of the registration interface 102 awaits another thread establishment operation.

Figure 12B:
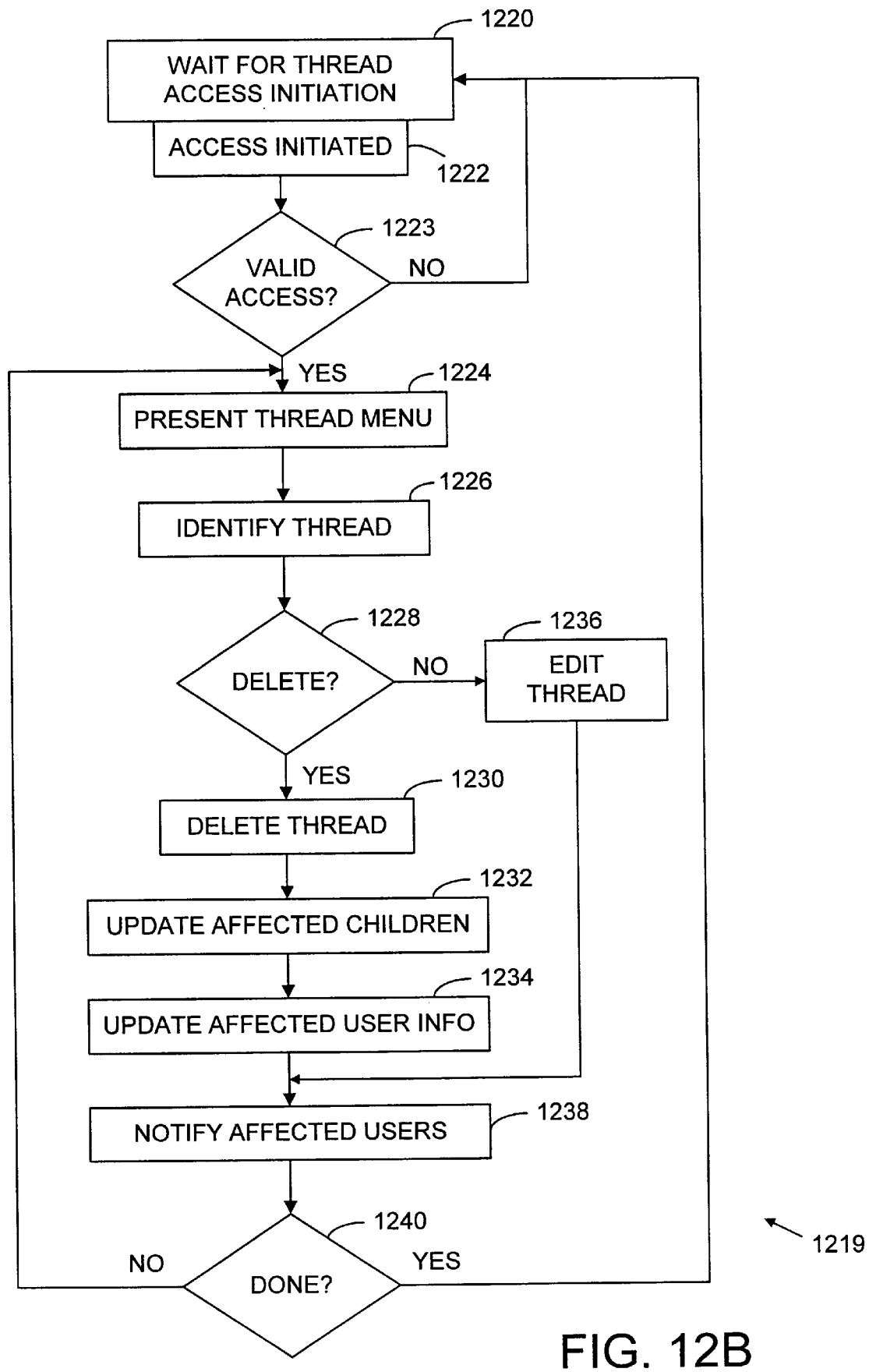

FIG. 12B illustrates operation 1219 of the structure registration segment 105 of the registration interface 102 during the editing of threads. Operation commences at step 1220 wherein the registration interface 102 awaits an edit request from a user or administrator. When such request is received at step 1222, the owner is authenticated at step 1223. Upon an invalid access attempt at step 1223, operation returns to step 1220. However, upon a valid access attempt as determined at step 1223, operation proceeds to steep 1224 wherein the registration interface 102 presents a thread menu to the administrator 114.

Next, at step 1226, the user or administrator identifies a particular thread of those presented at step 1224. At step 1228 the registration interface 102 queries the user or administrator whether the thread is to be deleted. If the thread is to be deleted at step 1228, operation proceeds to step 1230 wherein the thread is deleted. From step 1230, operation proceeds to step 1232 wherein the children threads of the thread information 111 are updated. Such updating would include altering the parent of the effected children so that their parents became the next higher thread in the structure. From step 1232, operation proceeds to step 1234 wherein affected user information 118 is updated. Such updating includes deleting thread associations from the user information 118 for the deleted thread.

If at step 1228 it was determined that the thread was not to be deleted but to be altered, operation proceeds to step 1236 wherein the thread information 111 for the thread is modified as directed by the user or administrator. From both steps 1234 and 1236, operation proceeds to step 1238 wherein the registration interface 102 notifies affected users of the thread and the owner of the thread as to the deletions and/or modifications to the thread. Then, from step 1238 operation proceeds to step 1240 where it is determined whether or not the current editing session is complete. If the current editing session is not complete, operation proceeds again to step 1224 wherein the registration interface 102 presents the thread menu again. However, if operation is complete at step 1240, operation proceeds to step 1220 wherein the registration interface 102 awaits a next access.

The registration interface 102 may operate in parallel to service numerous user or administrator sessions at a single time. Thus, operations discussed with reference to FIGS. 11 through 12B may be performed in parallel with multiple instances at any given time. Such access provides for flexibility in operation and great bandwidth. As was previously discussed, the components of the system 100 of the present invention may be distributed among a plurality of locations or located on a centralized server. Further, in other installations, while the communication server 110 may reside upon a central server with the registration interface 102, the access interface 104, notification interface 106 and submission interface 108 may be distributed to service the needs of distributed users.

Figure 13A:
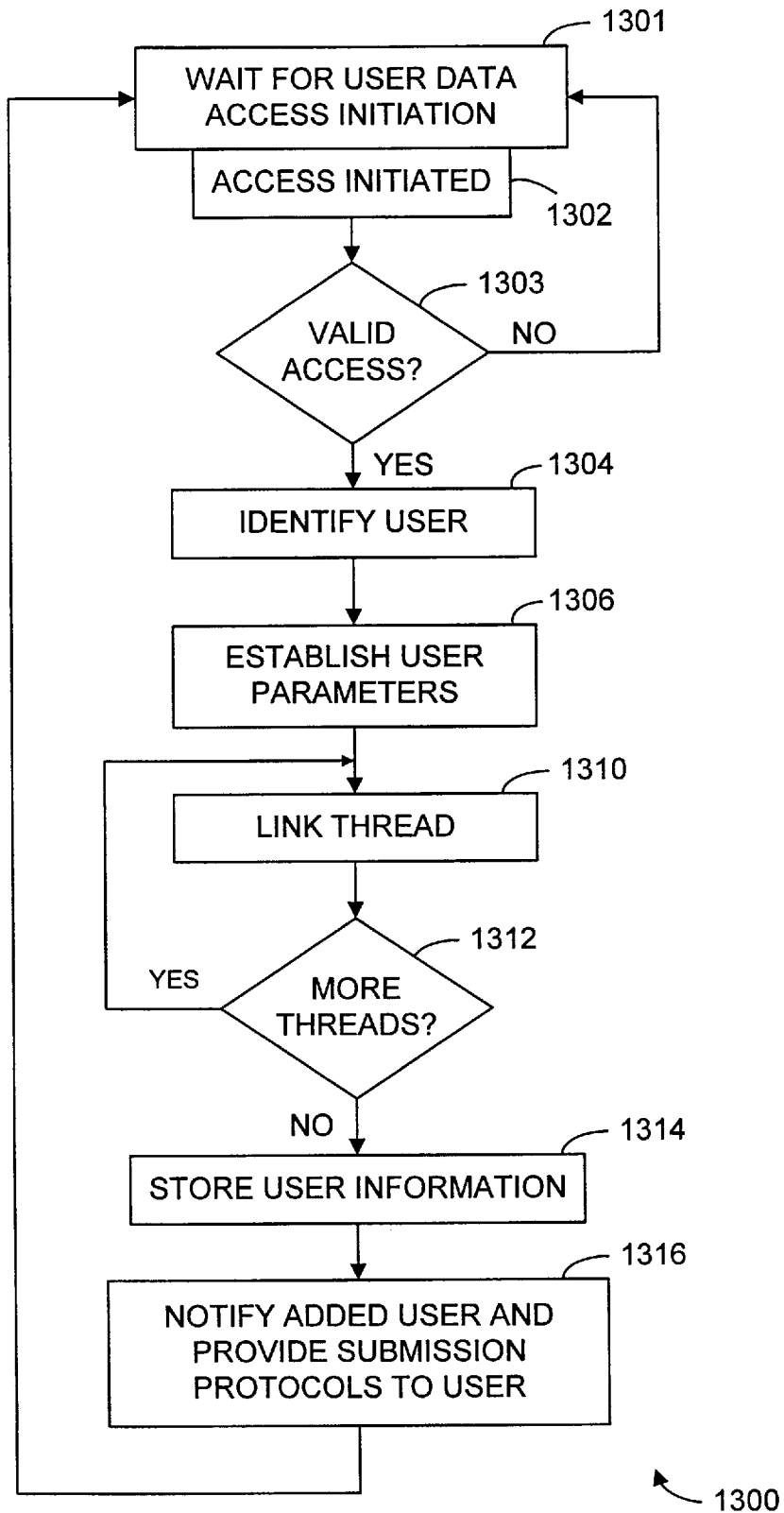
FIGS. 13A and 13B are flow diagrams illustrating operation of the registration interface of the system in the establishment and editing of user information.

FIG. 13A illustrates operation 1300 of the user registration segment 103 of the registration interface 102 in establishing user information. Operation commences as step 1301 wherein the registration interface 102 awaits an access by an administrator. At the initiation of an access at step 1302, the registration interface validates the access at step 1303. If the access is invalid, operation proceeds to step 1301 wherein the registration interface awaits a subsequent access. However, if the access is valid at step 1303, operation proceeds to step 1304 wherein the administrator identifies a user to be established. In some installations, some of the users having access to the system may establish other users of the system, depending upon the rights established for the establishing user.

After identification of the user at step 1304, the registration interface 102 establishes the user parameters for the user which may include the user's priority, password, and such additional information as is required. Operation then proceeds to step 1310 wherein a thread is linked to the user. Then, if at step 1312, the user indicates that no more threads are to be linked, operation proceeds to step 1314. However, if at step 1312, the user indicates that additional links are to be added, operation proceeds to step 1310 wherein another thread is linked. At step 1314, the registration interface 102 receives additional user information from the administrator and stores the user identifier as well as all related information obtained as user information 118. Then, at step 1316, the registration interface 102 notifies the added user and provides a submission protocol to the user for future use. From step 12316 operation proceeds again to step 1301 wherein the registration interface 102 awaits another access.

Figure 13B:
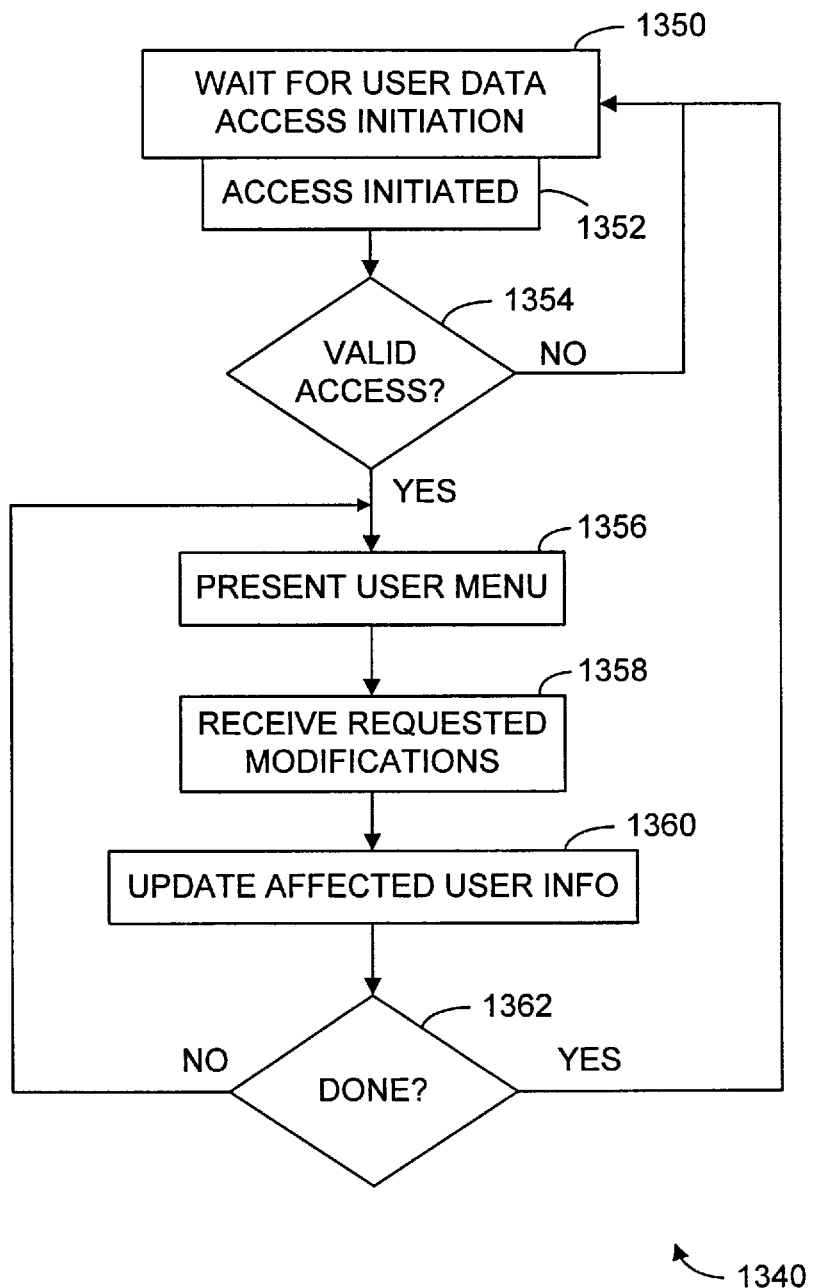

FIG. 13B illustrates operation 1340 of the user registration segment 103 of the registration interface 102 in the editing of user information 118. Operation commences at step 1350 wherein the user interface 102 awaits an access for editing user information 118. Upon the initiation of access at step 1342, operation of the registration interface 102 proceeds to step 1354 wherein the user interface 102 determines whether such access is valid. In some implementations of the system 100 of the present invention only a system administrator may perform edits to the users. In other implementations, each user may have privileges to initiate changes to his or her own user information. Thus, at step 1354, based upon the implementation and the user information 118, the registration interface 102 determines whether the access to edit user information is valid.

If such access is not valid at step 1354, operation proceeds to step 1350 wherein a subsequent access is awaited. However, if the access is valid at step 1354, operation proceeds to step 1356 wherein the user registration segment 103 of the registration interface 102 presents the a menu of proposed modifications. In such an implementation where a user may only edit his own information, such user information presented would include only that user information respective to the accessing user. However, when an administrator initiated access, operation at step 1356 would present the administrator with the option of editing a number of user information records.

Next, at step 1358, the registration interface 102 receives the requested modifications to the user information 118 and, at step 1360, updates the user information 118 stored and managed by the communication server 110. Then, at step 1362, the registration interface 102 determines whether all edits to the user information 118 are complete. If not, operation proceeds to step 1356. However, if all modifications are complete, operation proceeds from step 1362 to step 1250 wherein the registration interface awaits another edit user information access.

Figure 14A:
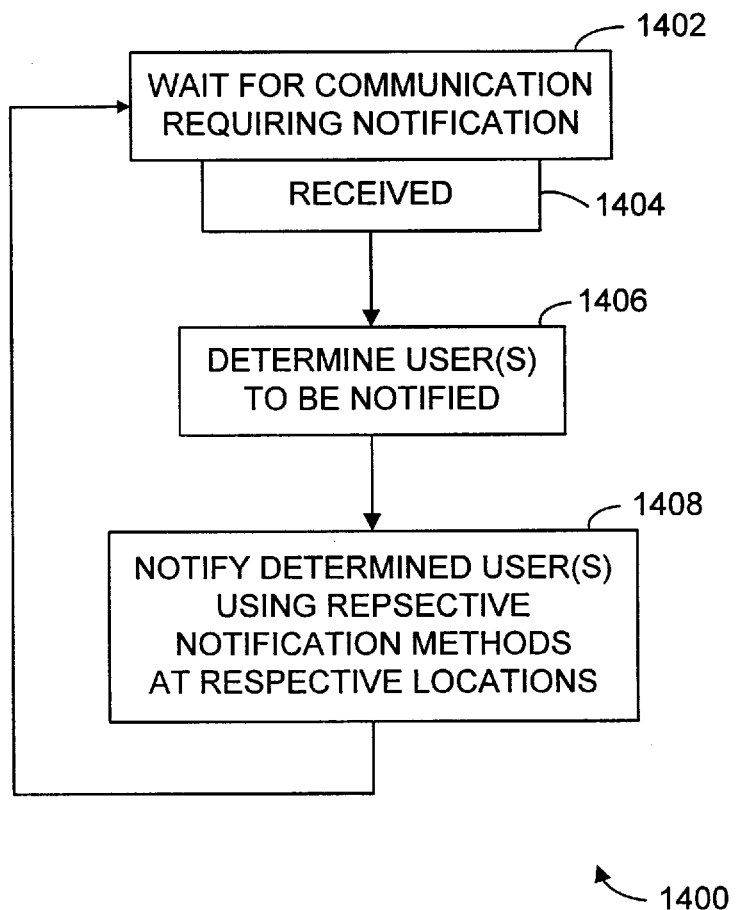
FIG. 14A is a flow diagram illustrating operation of the notification interface of the system.

FIG. 14A illustrates operation 1400 of the notification interface 106 of the system 100 of FIG. 1. Operation commences at step 1402 wherein the notification interface 106 awaits notification of a designated communication event from the communication server 110. Such designated communication event could relate to any particular communication received by the communication server 110 via the submission interface 108. Each communication received by the submission interface 108 is destined for at least one particular thread identified in the thread information 111. As was described previously, each user is associated with at least one thread. Thus, at step 1402, the communication server 110 determines whether a communication received required notifying any of the users identified in the user information 118. Such would be the case when a communication is received that is destined for a particular thread also designated by a particular user and having a notification priority level equal to or greater than the notification priority level for the particular user.

When such a communication requiring notification is received at step 1404, operation proceeds to step 1406 wherein the communication server determines which users are to be notified and provides such information to the notification interface 106 along with method of notification information for each such user to be notified. Next, at step 1408, the notification interface 106 notifies each of the determined users of the receipt of the communication in a corresponding notification format at a corresponding destination location. As was recalled with respect to FIG. 3, each user has his or her own notification method and notification address. Some users are notified by email while some users are notified by telephone, facsimile or pager. Thus, each user to be identified may be notified in a different fashion. Upon receipt of such notification, the user may then use the access interface 104 to access such communications.

Figure 14B:
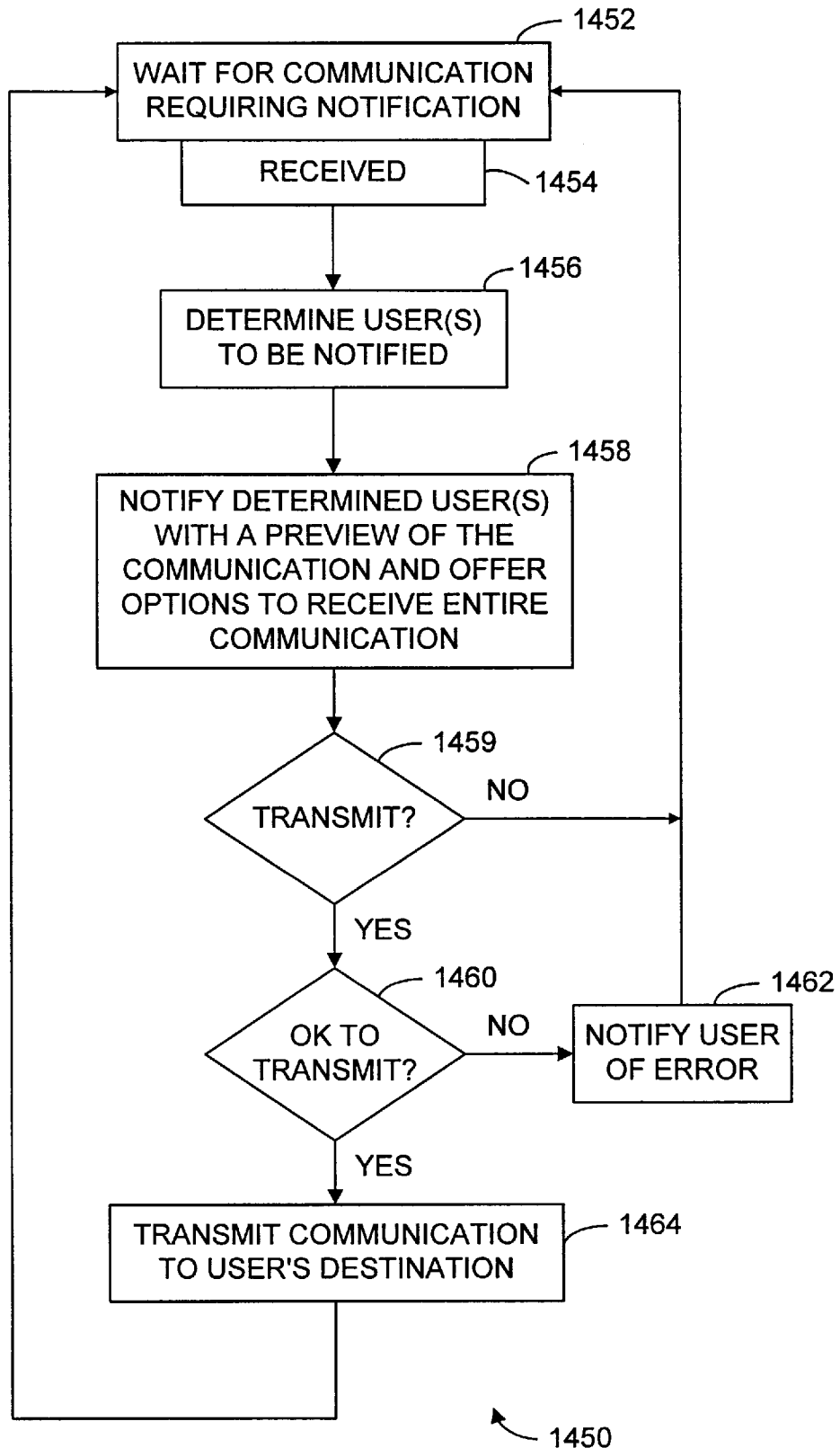
FIG. 14B is a flow diagram illustrating an alternative operation of the notification interface of the system.

FIG. 14B illustrates an alternative operation 1450 of the notification interface 106 of the system 100 of FIG. 1. Operation commences at step 1452 wherein the notification interface 106 awaits notification of a designated communication event from the communication server 110. When such a communication requiring notification is received at step 1454, operation proceeds to step 1456 wherein the communication server determines which users are to be notified and provides such information to the notification interface 106 along with method of notification information for each such user to be notified. Next, at step 1458, the notification interface 106 notifies each of the determined users of the receipt of the communication in a corresponding notification format at a corresponding destination location and offers options as to whether and how the user desires to receive the communication.

Then, at step 1459, the user indicates whether he or she desires to receive the communication. If the user does not desire to receive the communication at step 1459, operation returns to step 1452. However, if at step 1459, the user indicates that he or she desires to receive the communication, operation proceeds to step 1460 wherein the notification interface 106 or the notification interface 106 in conjunction with the access interface 104 determine whether it is OK to transmit the communication. If not, operation proceeds to step 1462 wherein an error message is sent to the user and then to step 1452. If at step 1460 it is determined that it is OK to transmit the communication, operation proceeds to step 1464 wherein the communication is transmitted to the user's desired destination.

Thus, as opposed to the operation described with reference to FIG. 14A, the operation allows the notified user to obtain delivery of the particular communication at such time the user is notified of the communication. Such operation could be of particular relevance in systems employing two-way pagers. In such situations, the notification interface 106 could communicate with such two-way pager, notifying a respective user that a communication has been received. The user could then communicate with the notification interface 106 via the two-way pager, directing the notification interface 106 to have the access interface 104 deliver the communication to a particular destination.

In view of the above detailed description of the present invention and associated drawings, other modifications and variations will now become apparent to those skilled in the art. It should also be apparent that such other modifications and variations may be effected without departing from the spirit and scope of the present invention as set forth in the claims which follow.

I claim:

1. A communication management system comprising:
   a structure registration interface that receives structure data and establishes a communication thread structure having a plurality of interconnected threads based upon the structure data;
   a user registration interface that receives user data and establishes user information based upon the user data, the user information linking a user with at least one thread of the plurality of interconnected threads;
   a submission interface that receives communications and at least one desired thread of the plurality of interconnected threads and links the communications with at least some of the plurality of interconnected threads;
   a communication server that establishes links between communications and user information based upon threads of the plurality of interconnected threads; and
   an access interface that receives a communication access request from a user, receives communications from the communication server based upon the communication access request, the user information and thread linkages between the communications and the user information and provides the received communications to the user.

2. The communication management system of claim 1, further comprising:
   a notification interface that notifies a user when a communication is received that is linked to the user by at least one thread.

3. The communication management system of claim 2, the notification interface notifying a user when a communication has been received that is linked to the user by at least one thread and has a notification priority greater than or equal to a notification priority respective to the user.

4. The communication management system of claim 2, the notification interface notifying a user when a communication has been received that is linked to the user by at least one thread, the notification interface notifying the user according to respective user notification information.

5. The communication management system of claim 1, the notification interface and the access interface allowing a user to direct receipt of a communication upon notification of the communication.

6. The communication management system of claim 1, the communications comprising voice mail communications, electronic mail communications, facsimile communications and electronic files.

7. The communication management system of claim 1, the communication thread structure organized according to a business structure.

8. The communication management system of claim 1, the user information including user identity, user password, user notification information, user security level, user notification priority, user delivery information and thread participation information.

9. The communication management system of claim 1, the submission interface appending communication information to communications, the communication information including communication content, communication time, communication source, communication priority, communication security level and related threads.

10. The communication management system of claim 1, the access interface communicating with a user via one communication medium and delivering a communication to the user via another communication medium.

11. The communication management system of claim 1, the access interface communicating with the user via a voice connection and delivering a communication to the user via a non-voice connection.

12. The communication management system of claim 1, the access interface and submission interface operable as on-line interfaces.

13. The communication management system of claim 1, the user registration interface providing submission protocol information to added users.

14. The communication management system of claim 1, the communication server generating submission protocol information based upon available resources.

15. The communication management system of claim 1, the submission interface precluding unauthorized submissions of communications.

16. The communication management system of claim 1, the communication server closing threads based upon closure criteria and preventing precluding submissions of communications to closed threads.

17. The communication management system of claim 1, the notification interface providing suggested threads to users for submission of communications.

18. A method of operating a communication management system comprising the steps of:

receiving communication thread structure data;

establishing a communication thread structure having a plurality of interconnected threads based upon the structure data;

receiving user data;

establishing user information based upon the user data, the user information linking a user with at least one thread of the plurality of interconnected threads;

receiving communications and at least one desired thread of the plurality of interconnected threads;

linking the communications with at least some of the plurality of interconnected threads;

establishing links between communications and user information based upon threads of the plurality of interconnected threads;

receiving a communication access request from a user;

receiving communications from the communication server based upon the communication access request, the user information and thread linkages between the communications and the user information; and providing the received communications to the user.

19. The method of claim 18 further comprising the step of:

notifying a user when a communication is received that is linked to the user by at least one thread.

20. The method of claim 19, further comprising the step of:

notifying a user when a communication has been received that is linked to the user by at least one thread and has a notification priority greater than or equal to a notification priority respective to the user.

21. The method of claim 19, further comprising the step of:

notifying a user when a communication has been received that is linked to the user by at least one thread, the notification interface notifying the user according to respective user notification information.

22. The method of claim 19, further comprising the step of allowing a user to direct receipt of a communication upon notification of the communication.

23. The method of claim 18, the communications comprising voice mail communications, electronic mail communications, facsimile communications and electronic files.

24. The method of claim 18, the communication thread structure organized according to a business structure.

25. The method of claim 18, the user information including user identity, user password, user notification information, user security level, user notification priority, user delivery information and thread participation information.

26. The method of claim 18, further comprising the step of:

appending communication information to communications, the communication information including communication content, communication time, communication source, communication priority, communication security level and related threads.

27. The method of claim 18, further comprising the step of:

communicating with a user via one communication medium and delivering a communication to the user via another communication medium.

28. The method of claim 18, further comprising the step of:

generating submission protocol information based upon available resources.

* * * * *